March 8, 1932.  C. W. FREDERICK  1,849,002
TWO-SPEED STEERING GEAR
Filed Sept. 12, 1930
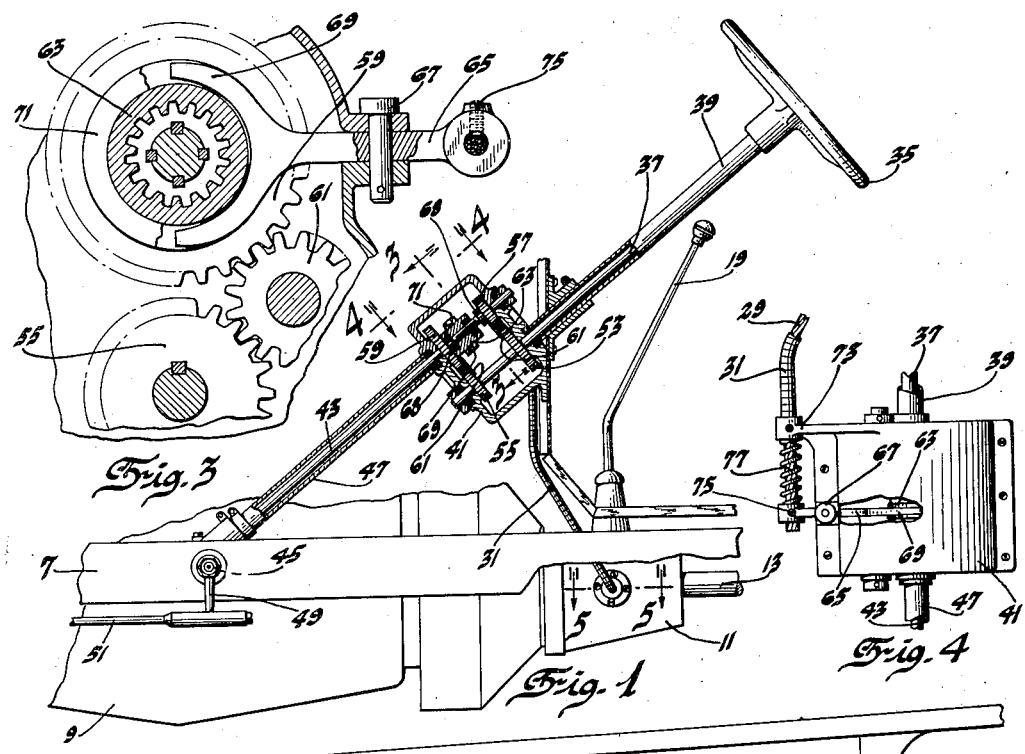
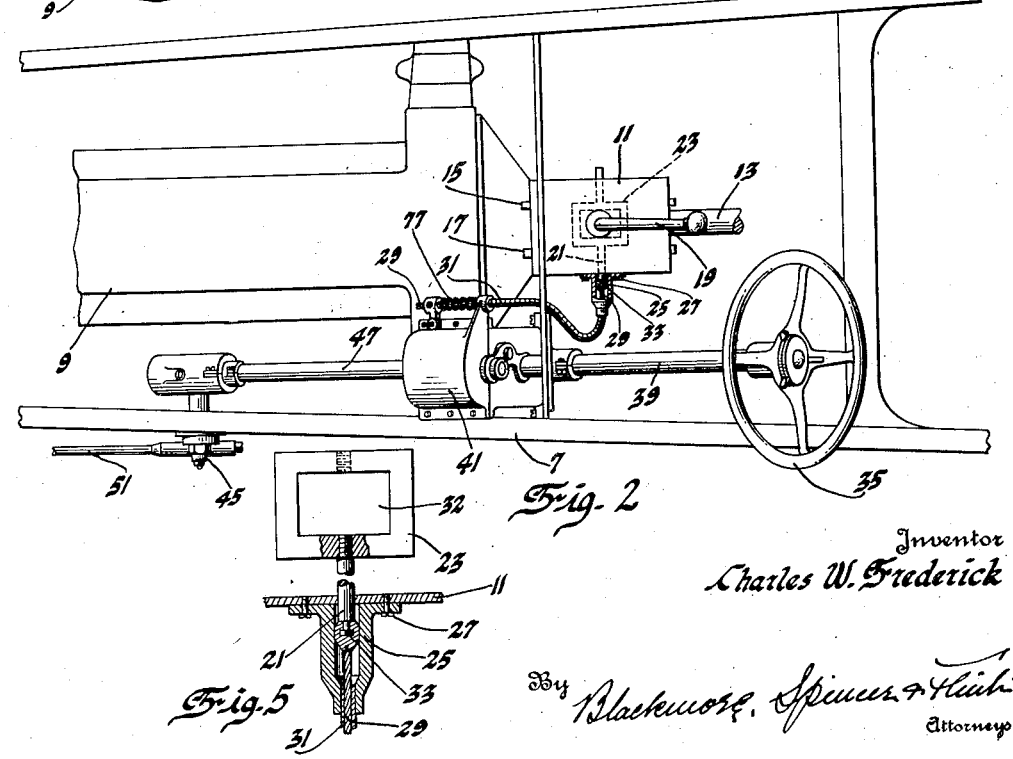
Inventor
Charles W. Frederick
By Blackmore, Spencer & Hiuti
Attorneys Patented Mar. 8, 1932

1,849,002

UNITED STATES PATENT OFFICE

CHARLES W. FREDERICK, OF SYRACUSE, NEW YORK, ASSIGNOR TO GENERAL MOTORS RESEARCH CORPORATION, OF DETROIT, MICHIGAN, A CORPORATION OF DELAWARE

TWO SPEED STEERING GEAR

Application filed September 12, 1930. Serial No. 481,388.

This invention relates to steering gear for motor vehicles.

One of the primary objects of the invention is to facilitate steering when parking the vehicle.

More particularly the invention is concerned with the provision of a two speed steering gear mechanism associated with the hand steering wheel whereby a high speed position may be used when driving the vehicle with its power transmission in high speed or in second speed, and whereby a low speed steering ratio may be used when driving the vehicle in low speed, or in reverse.

The invention further provides for means associated with the power transmission, and with the steering gear mechanism automatically operable to provide the steering gear ratios as explained above.

Other objects and advantages, such as, simplicity in construction and economy in manufacture will be understood from the following description and from the accompanying drawings.

In the drawings:

Figure 1 is a view in side elevation, partly broken away, and in section.

Figure 2 is a top plan view.

Figure 3 is a view in section, the section being shown on line 3—3 of Figure 1.

Figure 4 is a view of the invention as seen from line 4—4 of Figure 1.

Figure 5 is a sectional view, the section being indicated at line 5—5 of Figure 1.

Referring by reference characters to the drawings, numeral 7 represents a conventional chassis frame. The engine of the vehicle is represented at 9, and 11 is the change speed transmission housing. The driven shaft is shown at 13. Since no novelty is being asserted for the change speed mechanism, and since it may be of the usual kind, it is not illustrated. There are shown, however, the two usual shift rails 15 and 17 which are reciprocated by the gear shift lever 19. The rod 15 is to be so connected to the gearing within the housing 11 that when reciprocated from its neutral position, it provides for driving the vehicle in low speed, or in reverse. Rod 17, on the other hand, when engaged and moved by lever 19 makes the necessary connections for driving at high speed, or at second speed.

The movement of rod 19 transversely from one rail to the other is made use of to incidentally change the speed ratio of the steering mechanism. To that end a rod 21 is slidably mounted in the sidewall of housing 11 as perhaps is best shown in Figure 5. Within housing 11 the rod 21 is provided with an enlarged portion 23 having an opening 32 through which opening the shift lever 19 passes. This opening 32 is of sufficient length to permit the necessary fore and aft movements of the levers, which movements reciprocate the rails and make the several shifts. The transverse dimension of opening 32 is, however, such that as the lever 19 moves to its position in which it engages rail 15, it also engages one wall of the opening and moves the rod 21. Rod 21 reciprocates through and within a hollow fitting 25, secured as at 27 to the housing 11. The flexible cable 29 extends into the fitting which is secured as at 33 to the rod 21. Terminally secured to the fitting is a flexible casing 31 which houses the flexible cable 29. The other end of this flexible cable and its housing are to be connected to the steering mechanism as described below.

The steering mechanism is of some convenient kind providing two ratios are effected, preferably by shifting gears or clutches. To illustrate a specific embodiment, the drawings show a hand steering wheel 35, carried by a shaft 37, mounted within a column or tube 39. Shaft 37 enters a gear box 41. Shaft 43 extends from the gear box 41, and is operably connected to shaft 45 for rocking the latter. Shaft 43 may be housed within a tube 47. Shaft 45 has an arm 49 connected by a link 51 with mechanism, not shown, for turning the steering wheels in the usual manner. Within the gear box 41 shaft 37 is provided with two gears 53 and 55, these gears being in spaced relation and the latter 55 being the smaller. Both gears are fixed to the shaft. Also within the gear box, shaft 43 carries, rotatably mounted thereon, gears 57 and 59 of which gear 59 is the larger. Idler gears, one of which is shown at 61, in Figure 3, are provided, one between gears 53 and 57, and the other between gears 55 and 59, the purpose of these idlers being to give to shaft 43 the same direction of rotation as shaft 37. It should also be noted that owing to the gear dimensions, shaft 43 is rotated faster for a given rotation of shaft 37 when driven by the gear train including gear 57 than when driven by the gear train including gear 59. Slidably splined on shaft 43, within the gear box, is a clutch member 63. This clutch member has opposed internal teeth on one side to engage external teeth 68 on gear member 59, and the similar internal teeth on the other side of clutch 63 are to engage similar external teeth on gear 57. Clutch 63 is operated by a lever 65 pivoted at 67 to the gear box, and having a forked end 69, the furcations of which engage in a collar 71 provided on the clutch member 63. The gear box has a bracket 73 to which is secured the end of the flexible cable housing 31. The end of the flexible cable extends beyond the bracket 73, and is attached to the outer end of lever 65 as by a set screw 75. Surrounding the end of cable 29, and positioned between the fixed bracket 73 and the end of lever 65, is a coil spring 77, normally biasing the lever to a position wherein the clutch 63 engages gear 57, as a result of which engagement the steering is effected through that gear train which gives the higher of the two speed ratios.

The operation of the mechanism is as follows: If it be assumed that the power transmission by which the car is driven is in neutral, spring 77 maintains the steering gear mechanism in its high speed position. If now the lever 19 be moved to engage rail 15 (the reciprocation of which will produce low speed, or reverse where power rather than speed is needed in steering, especially as in maneuvering in and out of parking space) the lever 19 engages the side wall of the opening 23 and pulls rod 21, and through the instrumentality of cable 29, pulls lever 65 so that its inner end shifts clutch 63 to that position wherein gear 59 is locked to shaft 43, and steering at low speed and with greater mechanical advantage is obtained. As soon, however, as a shift is made from rail 15 such that the lever 19 ceases to hold the rod 21 inwardly within the housing 11, the spring 77 at once restores the lever 65 to that position wherein gear 57 is locked to shaft 43. It will, therefore, be clear that whenever driving at high speed, or at second speed, the steering requires a lesser rotation of the hand wheel.

It will also be understood that when a shift is made to render rail 15 operable for driving at low speed, or in reverse, the lower steering gear ratio through gear 59 becomes automatically available. The arrangement provided therefor assures automatic changes in the character of the steering mechanism to accommodate the kind of work which is required of it.

I claim:

1. In a motor vehicle, a steering gear mechanism therefor having gearing elements affording two unequal speed ratios, a lever operable thereon to render active the higher or the lower speed ratio, a change speed power transmission having shiftable elements for driving the vehicle at a plurality of speeds or in reverse, a lever to shift said elements, a rod slidably mounted in the housing of said change power speed transmission, a flexible connection between said rod and the said lever associated with the steering mechanism, said rod having an opening to accommodate certain movements of the lever associated with the gear shift mechanism, said rod also having an abutment engaged by said lever to operate said rod and through the instrumentality of said flexible connection to shift the steering gear to its low speed ratio when the gear shift lever is moved to a position from which low speed and reverse shifts may be made.

2. The invention defined by claim 1 together with resilient means to normally maintain the steering gear in its high speed position.

3. The invention defined by claim 1 together with resilient means engaging said lever of the steering gear mechanism to normally hold the steering gear elements in their high speed position.

4. In a motor vehicle, steering mechanism including a movable member and parts shiftable to effect a plurality of steering ratios through which parts in either of its positions of shifting said movable member operates in steering, mechanism independent of said movable member to shift said shiftable parts, shiftable power transmission mechanism for driving at a relatively high speed or at a relatively low speed, a second member movable to two positions from one of which the high speed drive may be effected and from another of which the low speed drive may be effected, a second mechanism movable by and with said second member in its specified movement and a connection between said mechanisms.

5. In a motor vehicle, steering mechanism constructed to provide a plurality of steering ratios, a lever to shift said mechanism to render the one or the other ratio operable, a power transmission having a lever movable transversely to two positions from one of which the lever may be moved to effect a high speed or an intermediate speed, and from another of which positions low and reverse speeds may be had by movement of the lever, means movable with said lever in its transverse movement, and an operable connection between said last-mentioned means and the lever of the steering mechanism.

6. The invention set forth in claim 5, said last-named means being a part having a rectangular opening through which the transmission lever passes, the length of said opening permitting unrestricted movement of the lever in one direction but the width of which opening is such that the part is moved with the transmission lever in its transverse movements.

In testimony whereof I affix my signature.

CHARLES W. FREDERICK.